United States Patent [19]

Lemmer

[11] Patent Number: 5,073,141
[45] Date of Patent: Dec. 17, 1991

[54] ACCESSORY DEVICE FOR A SAUSAGE STUFFER

[75] Inventor: Josef Lemmer, Sorrento, Canada

[73] Assignee: H. Maurer & Sohne Rauch-Und Warmetechnik, Fed. Rep. of Germany

[21] Appl. No.: 458,722

[22] PCT Filed: Aug. 10, 1988

[86] PCT No.: PCT/EP88/00716
§ 371 Date: Mar. 26, 1990
§ 102(e) Date: Mar. 26, 1990

[87] PCT Pub. No.: WO89/01290
PCT Pub. Date: Feb. 23, 1989

[51] Int. Cl.⁵ .............................................. A22C 11/00
[52] U.S. Cl. ........................................ 452/30; 99/441; 426/513
[58] Field of Search ............... 452/50, 35, 30, 32; 426/513, 516, 646, 243, 105, 113, 118, 135; 99/353, 441

[56] References Cited

U.S. PATENT DOCUMENTS

| 3,889,013 | 6/1975 | Moule | 452/30 |
| 4,280,803 | 7/1981 | Treharne | 426/513 |
| 4,294,858 | 10/1981 | Moule | 426/513 |
| 4,379,356 | 4/1983 | Geissbühler | 426/513 |
| 4,997,663 | 3/1991 | Potthast | 426/241 |

FOREIGN PATENT DOCUMENTS

| 0040775 | 5/1981 | European Pat. Off. |
| 1432481 | 11/1962 | Fed. Rep. of Germany |
| 268687 | 12/1926 | United Kingdom |

Primary Examiner—Willis Little
Attorney, Agent, or Firm—Walter A. Hackler

[57] ABSTRACT

An accessory device for a sausage stuffer serving for the production of skinless sausages, or the like, comprises pipes which are connected to a filling pipe of the sausage stuffer and which are subdivided into different sections maintained at different temperatures so that skinless sausages can be produced.

10 Claims, 2 Drawing Sheets

ACCESSORY DEVICE FOR A SAUSAGE STUFFER

The present invention relates to an accessory device for a sausage stuffer for the production of skinless sausages, or the like, having a pipe arrangement adapted for being connected to the filling pipe of the sausage stuffer and comprising heating stations arranged one behind the other.

During production of sausages, in particular barbecue sausages, so-called breakfast sausages, hot dogs, grilling sausages, and the like, the sausage mass is filled into animal or artificial casings by a sausage-stuffing device, using a stuffing horn having a length of approx. 25 to 30 cm. After filling of the casings, the sausage mass is cooked by processing the sausages in a processing oven. Following this step, the sausages are transferred into a water bath. For some sausage types, the cooking process is followed by the so-called peeling or skin-removal process, which mostly takes place in a water bath when the sausages are cut to length. In other cases, peeling of the sausages is effected mechanically, by means of so-called peelers.

The use of artificial casings is expensive, and this is even more critical in the production of skinless sausages as in this case the skin has to be removed by a subsequent peeling process and is then thrown away. Quite apart from the expenses connected with the described process, the operation of spooling the casings on the filling pipe and/or the stuffing horn of the sausage machine is complicated and troublesome and requires skillful operators. Especially in the case of small-caliber sausage types, this operation requires a high labor input. The operation of spooling the casing on the filling pipe of the sausage machine, the separate scalding process following the stuffing operation, and finally the additional removal of the peel-off casings have for their consequence that approximately 6 to 8 operators must be employed per sausage machine if the latter is to be operated continuously. This situation is even aggravated by the fact that due to these different processes, the observation of the prescribed sanitary regulations is extraordinarily difficult and/or connected with correspondingly high expenses.

From DD 246 699 A1 an accessory device has become known which is designed for connection to the filling pipe of the stuffing machine which normally receives the casings for filling in the sausage emulsion. In the case of this known accessory device, skinless sausages are to be produced by loading the sausage emulsion into a pipe provided with tubular electrodes which are separated from each other by electrically non-conductive pipe sections. The electrodes are supplied with a low-frequency current which flows from one electrode to the neighboring electrode, through the sausage mass contained in the non-conductive pipe section, thereby heating up the sausage emulsion in that pipe section. It is said that when the non-conductive pipe sections with the electrodes are multiplied in a convenient manner, the sausage mass will finally be well-done all through. However, the electric field extending between the electrodes, along the pipe section, will be distributed over the pipe cross-section with a sufficient degree of uniformity only if the length of the pipe section is relatively big, compared with the pipe diameter. In addition, it is a consequence of the skin effect that the flow lines are displaced to the periphery of the cross-section and the selected current density may not be too high. Finally, the conductivity varies as the sausage emulsion gets more and more solid. In addition, the conductivity of the sausage emulsion will rarely be exactly uniform over the full cross-section of the pipe, due to the different mass components, and the current always finds its way from electrode to electrode along the path of least resistance. Consequently, it is not possible with the aid of the described arrangement to achieve the desired uniform distribution of the current density and, accordingly, uniform heating of the mass over the whole cross-section. If, however, this known arrangement is given a length sufficient to ensure that even areas with a low current density will get well-done, then decomposition phenomena of the mass will already be encountered in areas of higher current density.

The same applies with respect to the arrangement known from US-PS 3 235 388 which differs from the arrangement described last substantially by the fact that the arrangement known from US-PS 3 235 388 makes use of a high-frequency alternating current which greatly contributes towards displacing the current path to the periphery of the cross-section.

From NL-A-6 400 923 a device has been known which comprises a feeding pipe built up from several pipe sections. The individual pipe sections are heated by means of a high-frequency alternating current. This arrangement is also connected with the problem that the core area and the marginal areas reach different cooking states.

For an arrangement known from DE-OS 27 46 680 it is said that the current of only 50 Hz produced by cylindrical electrodes heats up substantially the core area in the pipe section between the electrodes thereby increasing substantially the conductivity in this area. The outer areas along the periphery of the rope is to be cooked until well-done by heating up the pipe surface. This arrangement requires much space and great apparatus input, but does all the same not guarantee that the product obtained is perfectly and uniformly cooked and well-done throughout.

CH-A-657 507 describes a device comprising a nozzle attachment by means of which the sausage emulsion can be divided into separate rectangular ropes. However, with this nozzle attachment, the ropes can only be deposited loosely on flat grids.

Now, it is the object of the present invention to ensure rapid and simple production of skinless sausages, with little input of labor.

This object is achieved according to the invention by the fact that the first heating station, in the direction of flow of the sausage mass, is preceded by a cooling station and that the pipe arrangement can be connected with the filling pipe via a bell-shaped pipe end which is followed by a pipe or pipe bundle.

According to the invention, the production of sausages includes the steps of transferring the sausage mass from the sausage machine or the sausage stuffer into a pipe and/or pipe bundle connected to the filling pipe of the sausage stuffer, and transporting it inside such pipe or pipe bundle over a considerable length, thereby moving the sausage mass through different stations. After the sausage mass has left the sausage stuffer, it is subjected, in a first zone, to a so-called red coloration process at a temperature of below 50° Centigrade whereby a sufficiently strong outer skin is formed on the sausage mass transported within the pipe. Following this zone, the sausage mass reaches a zone of higher temperature of between 75° and 90° Centigrade, depending on the type of sausage to be produced, where the sausage mass is then cooked to the desired final state. When the sausage then leaves the pipe, it only has to be cut to the desired length manually or automatically. This device, therefor, does away with the need for casings altogether. And consequently, there is also no need for the peeling process heretofore required with the known processes. Moreover, the sausage mass is cooked directly inside the pipe or the pipe bundle and, consequently, in the unit connected to the sausage stuffer, so that the number of individual processes is reduced which also helps ensure perfect production of the sausages, under hygienic points of view. The fact that the respective manual operations are rendered superfluous also leads to corresponding cost savings during production.

Depending on the desired capacity, the device may be equipped with any desired number of pipes of different shapes and/or calibers. According to one convenient embodiment of the invention, the pipes have a diameter of 20 to 22 mm. The length of the pipe bundle is approx. 3.5 m. for this pipe diameter. However, the length may also be much greater and is finally determined by the desired degree of cooking of the product and the caliber of the pipes.

According to one convenient embodiment of the invention, the heating stations are preceded by a cooling station. The cooling station ensures that the sausage mass will not start solidifying before it is filled into the individual pipes of the pipe bundle, in order to guarantee perfect stuffing of the sausage mass in the pipes of the pipe arrangement. Consequently, the cooling station which serves to keep the sausage mass substantially at ambient temperature, is arranged advantageously at or near the transition between the filling pipe of the sausage stuffer and the pipe arrangement. Cooling will be required in all cases where the heat required for the heating process in the heating stations makes itself felt also in the transition area between the filling pipe of the sausage stuffer and the pipe arrangement. If the pipe arrangement is insulated properly, there may be no need for such a cooling station.

The cooling station also ensures that at the moment it enters the heating station the sausage mass has a predetermined temperature and that, when a funnel-shaped component is arranged upstream of the pipe openings, the sausage emulsion arriving from the sausage stuffer is distributed evenly over a plurality of pipe openings.

According to one embodiment of the invention, the pipes of the pipe arrangement are made from stainless steel. Heating of the pipes may be effected directly via a heat-carrying agent, such as water or oil, which is heated up by suitable heating elements, such as heating rods. In order to maintain the individual zones at a constant temperature, the temperature is controlled by thermostats. In addition, the individual zones are divided by partition walls whereby separate chambers are formed for the heat-carrying agents. Heating-up of the agents may be achieved by electric current, gas, oil, steam, or the like. For safety reasons, there may be provided expansion tanks With safety valves. An overflow is provided, in particular, in the area of the cooling station.

Other convenient improvements of the invention are characterized by the features specified in the subclaims.

According to one embodiment of the invention, the heatcarrying agent used for transmitting the heat to the pipe sections is replaced by one or more devices generating microwaves, and the pipe sections in which the sausage emulsion is to be heated up consist of a material permeable to microwaves. By heating the device directly by microwaves, one achieves uniform solidification of the sausage emulsion over the whole cross-section. This heating process using microwaves may be carried out already at the first heating station where the sausage emulsion is to be heated up only to the temperature required for red coloration. Microwaves may be used as a heating source also in other heating stations, while still other heating stations may continue to use an indirect heating system and heat-carrying agents. Finally, microwave generators may be used as heating sources for all heating stations.

According to one embodiment of the invention, the first heating station is followed by a pipe section in which the sausage emulsion has a temperature maximally equal to the temperature reached in the first heating station, or a somewhat lower temperature. This pipe section is to give the sausage emulsion the time required by it for completing the red coloration process commenced in the first heating station. The length of this unheated zone depends on the reactivity (proneness to redden) of the sausage emulsion. It goes without saying that the first heating station and the other heating stations as well are adjusted, depending on the given flow velocity and the cross-section of the pipe, to ensure that uniform heating and coagulation of the sausage emulsion occurs over the whole pipe cross-section. However, the use of microwaves as a heating source provides the advantage that both the cooking process and the whole arrangement can be shortened considerably.

The water released from the sausage emulsion during the heating-up and cooking process gets trapped in the pipes. In the case of the known arrangement, it leaves the opening of the accessory device together with the finished sausage mass. Although it is of course possible to collect the water at this point, smaller or larger water pockets will form inside the pipe at the surface of the sausage so that the skinless sausage will never have a smooth surface.

Consequently, it is provided according to one embodiment of the invention that the pipe walls are equipped with means for evacuating from the pipe cross-section the water released by the sausage mass during the heating-up process. Such means can be implemented irrespective of the particular type of heating source used in the heating stations, and also irrespective of whether or not a cooling zone is arranged between the sausage stuffer and the accessory device in the particular embodiment of the invention. In particular, such water-evacuating means may be provided on the pipe sections immediately following the first heating station.

The devices for evacuating the liquid released during heating or cooking of the sausage emulsion may be implemented in different ways. In the case of horizontal pipe sections, for example, openings may be provided in the lower wall of the pipes and the openings may be so small that only the liquid is drained through such holes, without any particles of the sausage emulsion. In other embodiments of the invention, the pipes may be provided with a bell-shaped portion in which the next following pipe section is fitted leaving an annular gap, the bell-shaped portion widening in a direction opposite to the direction of flow so that no sausage mass will escape through the gap.

The draining openings may open into at least one collecting pipe arranged for draining the liquid to the outside, if necessary by passing through a heating source or a heat-transmission agent.

One embodiment of the invention will now be described with reference to the drawing in which.

Figure 1:
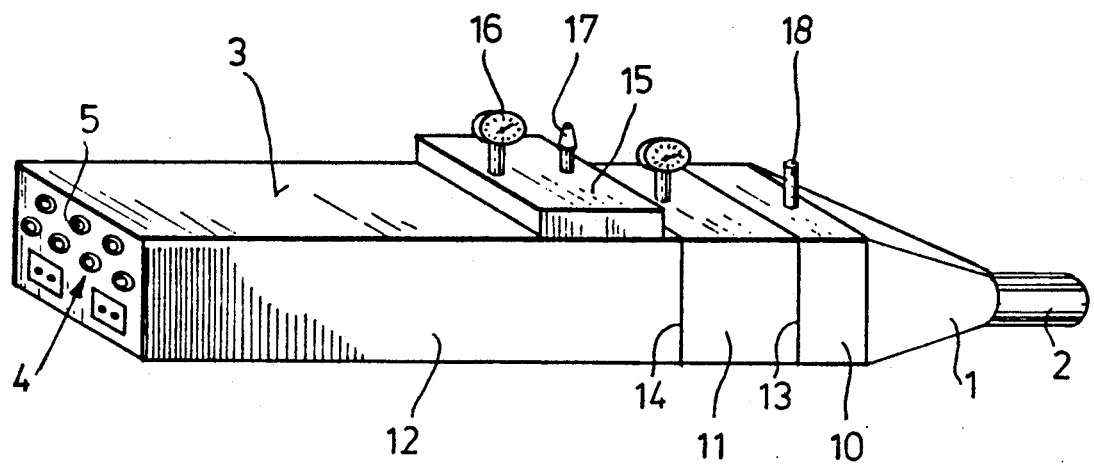
FIG. 1 shows a diagrammatic perspective representation of one embodiment of an accessory device according to the invention.
Figure 2:
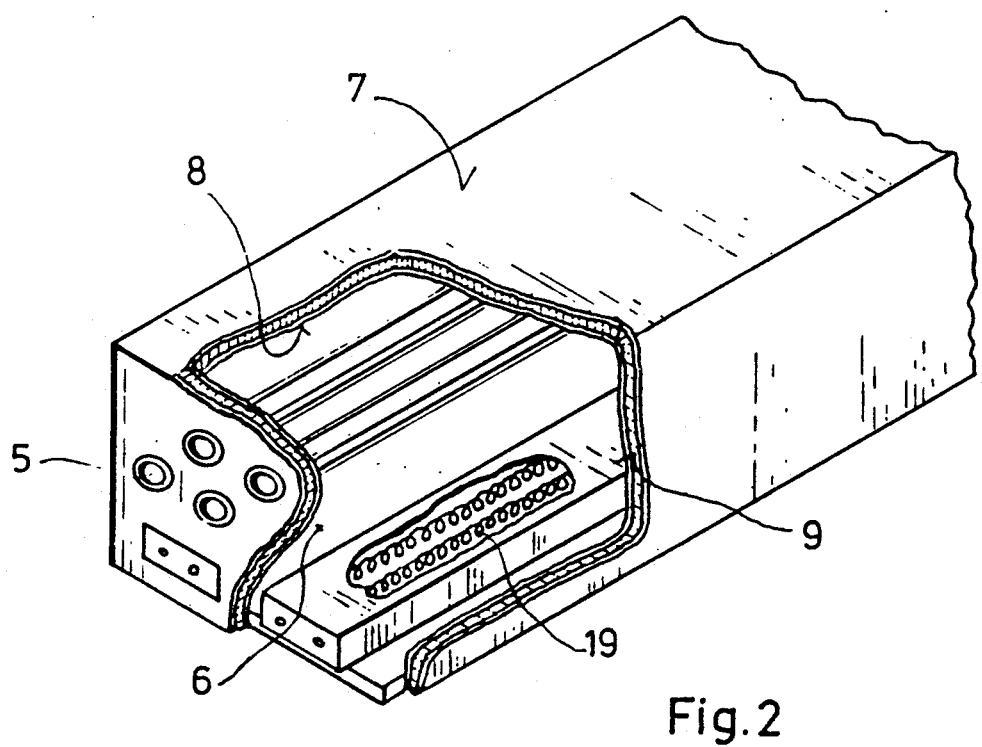
FIG. 2 shows a perspective view, partly broken up, of the free end of the device according to FIG. 1.

The accessory device illustrated in FIGS. 1 and 2 is connected, via a widening connection pipe 1, to a connection 2 of a matching filling pipe of a sausage machine, in particular a sausage stuffer, not shown in detail in the drawing. The connection pipe 1 is followed by a housing 3 which accommodates a pipe bundle 4 consisting of a plurality of parallel pipes 5. The pipes 5 are arranged at a certain spacing relative to each other and surrounded by a heat-carrying agent 6 contained in the housing 3.

As can be seen best in FIG. 2, the housing 3 of the illustrated embodiment is formed by an outer shell 7 and an inner shell 8, with an insulating layer 9 arranged between the inner shell and the outer shell. Finally, the housing 3 accommodates a heating system which, in the illustrated embodiment, consists of spiral heating elements 19, but which may also consist of heating rod (not shown) extending in parallel to the pipes 5 of the pipe bundle 4. The number and design of the heating elements 19 is determined by the temperature to be achieved and, in particular, by the number of pipes contained in the housing 3.

From FIG. 1 it appears that the housing 3 is subdivided into different zones, namely a cooling station 10 which is arranged adjacent the connection pipe 1 and which is followed by a first heating station 11 and another adjacent heating station 12. The individual stations are separated by partition walls 13 and 14 so that each station comprises its own chamber for the heat-carrying agent, separate from the chambers of the other stations, although the partition walls 13 and 14 are passed by the pipes 5.

According to FIG. 1, at least the last heating station 12 has assigned to it an expansion tank 15 equipped with a thermometer 16 and a safety valve 17. In addition, at least the cooling station 10 is equipped with an overflow 18. The inlet and outlet valves for the heat-carrying agent 6 for the different stations are not shown in the drawing.

The number and caliber of the pipes may be selected as required. Conveniently, however, the pipes have a diameter of 20 to 22 mm. The length of the pipes and, consequently, of the housing 3 is equal to approximately 3.5 m for a caliber of 20 to 22 mm, if a well-done product is to be obtained.

The individual heating stations 11 and 12 and the cooling station 10 are regulated separately, controlled by a thermostat. In the cooling station 10 the sausage mass is maintained substantially at a temperature Which ensures that the raw sausage mass arriving from the sausage stuffer can be loaded perfectly into the pipe bundle 4. The first heating station 11 following the cooling station 10 serves for heating the sausage mass up to a temperature below 50° Centigrade, i.e. below the albumen coagulation temperature. Conveniently, the mass is heated up in this area to a temperature of between 45° Centigrade and 48° Centigrade. On its way through the second heating station 12, which has a considerably greater length compared with the heating station 11, the sausage mass is then heated up gently and gradually to the desired cooking temperature of 75° Centigrade to 90° Centigrade.

In operation of the accessory device, the sausage mass emerging from the sausage stuffer is moved continuously through a number of pipes 6 immersed in the circulating heatcarrying agent 6 which has a constant temperature of between 45° to 48° Centigrade or 75° to 90° Centigrade in both stations. During this passage the mass is subjected to red coloration, coagulation, and cooking. Once the mass emerges from the pipes 5, it is cut to the desired length manually or automatically. The length of the pipes 5 is determined by the caliber and/or the cooking state (core temperature 65° to 72° Centigrade).

It goes without saying that, depending on the desired capacity, the device may be equipped with any desired number of pipes 5 of different shapes and/or calibers. Heating-up of the heat-carrying agent 6 is effected by means of electric current, gas, oil, steam or any other suitable means. The pipes 5, and the housing 3 of the device as well, are made conveniently from stainless steel.

Figure 3:
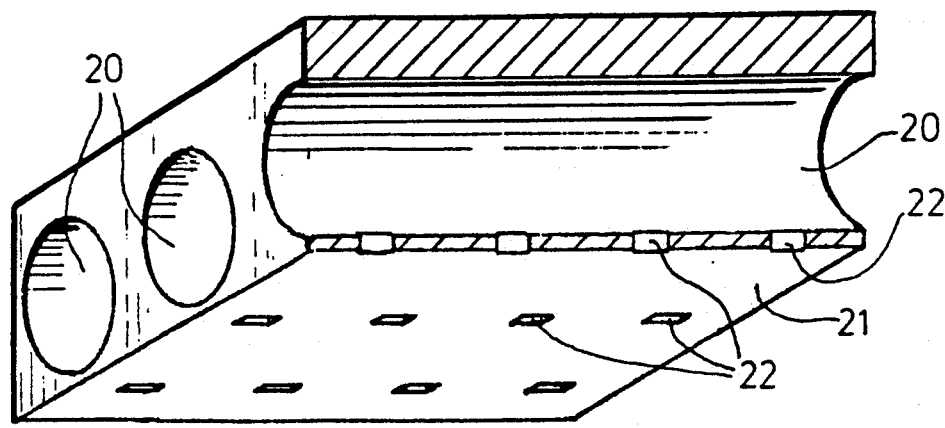
FIG. 3 shows a cross-section, viewed obliquely from below, of part of a block provided with tubular openings for the sausage emulsion.
Figure 4:
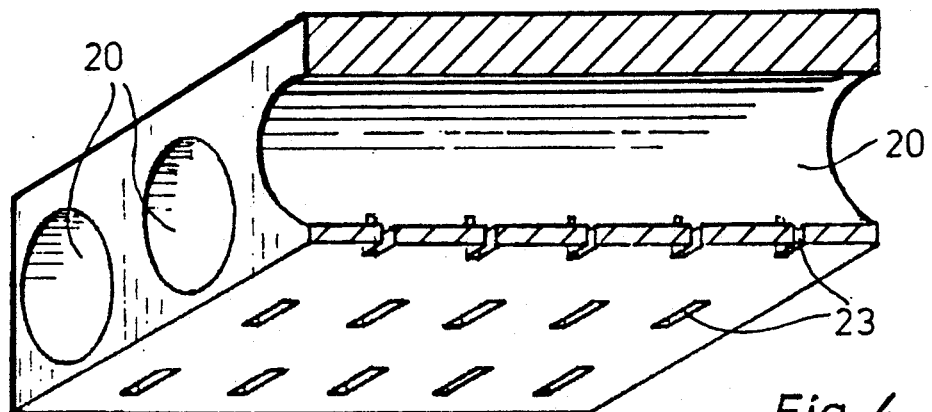
FIG. 4 shows a representation similar to FIG. 3 of a somewhat different embodiment of the drainage system.

In the case of the embodiment of the invention illustrated in FIGS. 3 and 4, the pipes 5 containing the sausage emulsion take the form of tubular openings 20 provided in a solid block 21. The drawing shows a cross-section through the front opening 20 and the block 21. In the case of the embodiment illustrated in FIG. 3, small slots 22 are provided in the bottom wall of the tubular openings 20 in longitudinal direction, i.e. parallel to the pipe axis, which slots serve for draining the liquid released by the sausage emulsion during heating and/or cooking.

The embodiment of the invention illustrated in FIG. 4 differs from that of FIG. 3 by the fact that slot-like openings 23 provided in the bottom of the tubular openings 20 extend transversely to the pipe axis of the openings 20, but are likewise arranged at the lowest point of such openings 20.

Figure 5:
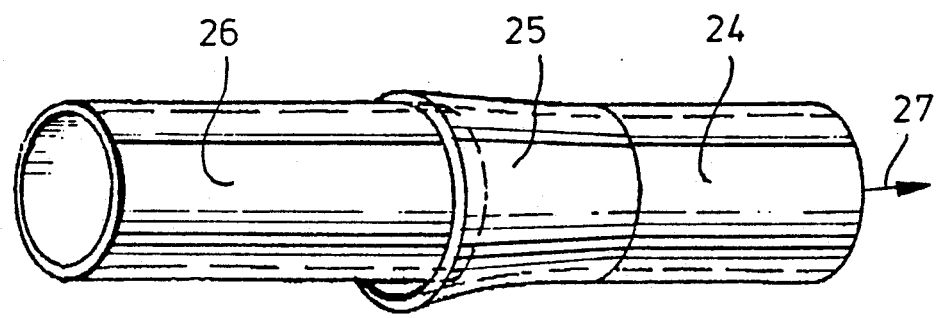
FIG. 5 shows two assembled pipe sections of a different embodiment of the drainage system.

In the case of the embodiment according to FIG. 5, a pipe section 24 is provided with a portion 25 widening to a bell-like shape. Another pipe section 26 is fitted therein in such a manner that an annular gap is formed at the end of such pipe section, between the inner wall of the widening bell-like portion 25 and the outer wall of the pipe section 26. The gap so formed serves for carrying off the liquid released from the sausage emulsion during the heating-up and cooking process. The sausage emulsion is moved through the pipe sections 24, 26 in the direction indicated by arrow 27, which means that the bell-like section 25 widens in a direction opposite to the direction of flow of the sausage emulsion.

I claim:

1. Accessory device for a sausage stuffer for the production of skinless sausage, or the like, said sausage stuffer having a fitting pipe, said accessory device comprising:

elongated pipe arrangement means for continuous feeding of sausage mass therethrough, said elongated pipe arrangement means including a plurality of parallel pipes and widening connection pipe means for being connected to the fitting pipe of the sausage stuffer;

a first and a second heating station disposed adjacent one another along said elongated pipe arrangement; and a cooling station disposed along said elongated pipe arrangement adjacent said first heating station on a side thereof upstream of the sausage mass flow through the elongated pipe arrangement.

2. The device according to claim 1 wherein said first heating station includes means for heating the sausage mass to a temperature below about 50° Centigrade and said second heating station includes means for heating the sausage mass to a temperature above about 50° Centigrade.

3. The device according to claim 1 or 2 wherein the pipes of the pipe arrangement means are disposed in a heatable heat-carrying agent, the agent being surrounded by an insulating jacket.

4. The device according to claim 3 wherein the cooling and heating stations are divided into separate chamber means for containing said heatable heat-carrying agent.

5. The device according to claim 4 further comprising at least one expansive tank means, including a safety valve, for accepting said heatable heat-carrying agent.

6. The device according to claim 1 wherein said plurality of parallel pipes are permeable to microwaves and each said means for heating the sausage mass in said first and second heating stations comprise a microwave source.

7. The device according to claim 3 wherein said elongated pipe arrangement further comprises non-heated pipe section means, disposed downstream from said first heating station means, for maintaining the sausage mass therein at a temperature not exceeding the temperature the sausage mass attains in the first heating station means.

8. The device according to 1 or 2 wherein said pipe arrangement means further comprises means for draining liquid released by the sausage mass during heating thereof from the plurality of parallel pipes.

9. The device according to claim 8 wherein each pipe comprises a plurality of sections and the means for draining liquid includes bell-shaped end portions disposed on each of said sections and sized to fit into an adjacent pipe section, said bell-shaped end portions having a widening diameter in a direction opposite to the flow of sausage mass.

10. The device according to claim 9 further comprises means for collecting the drained liquid and passing same to a position outside said elongated pipe arrangement means.

* * * * *